Oct. 25, 1949.  W. P. MASON  2,486,187
PIEZOELECTRIC CRYSTAL APPARATUS
Filed April 9, 1947  2 Sheets-Sheet 2
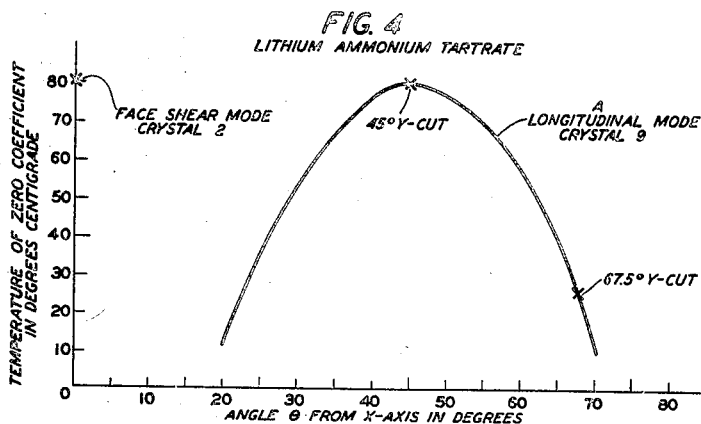
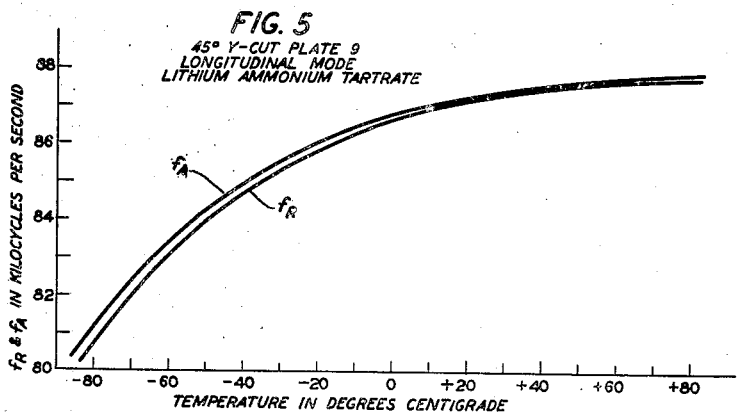
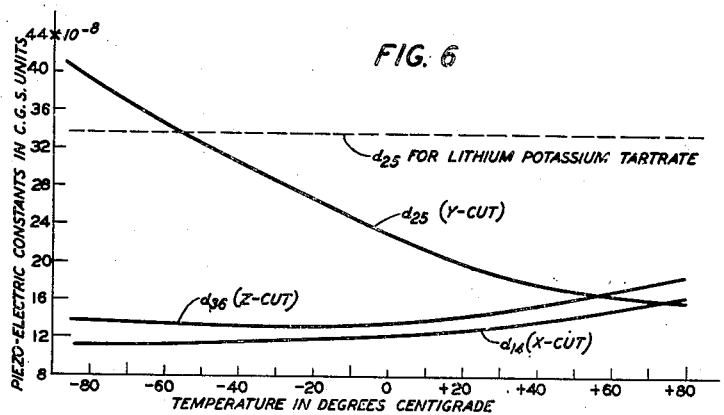
INVENTOR
*W. P. MASON*
BY
*W. J. O'Neill*
ATTORNEY Patented Oct. 25, 1949

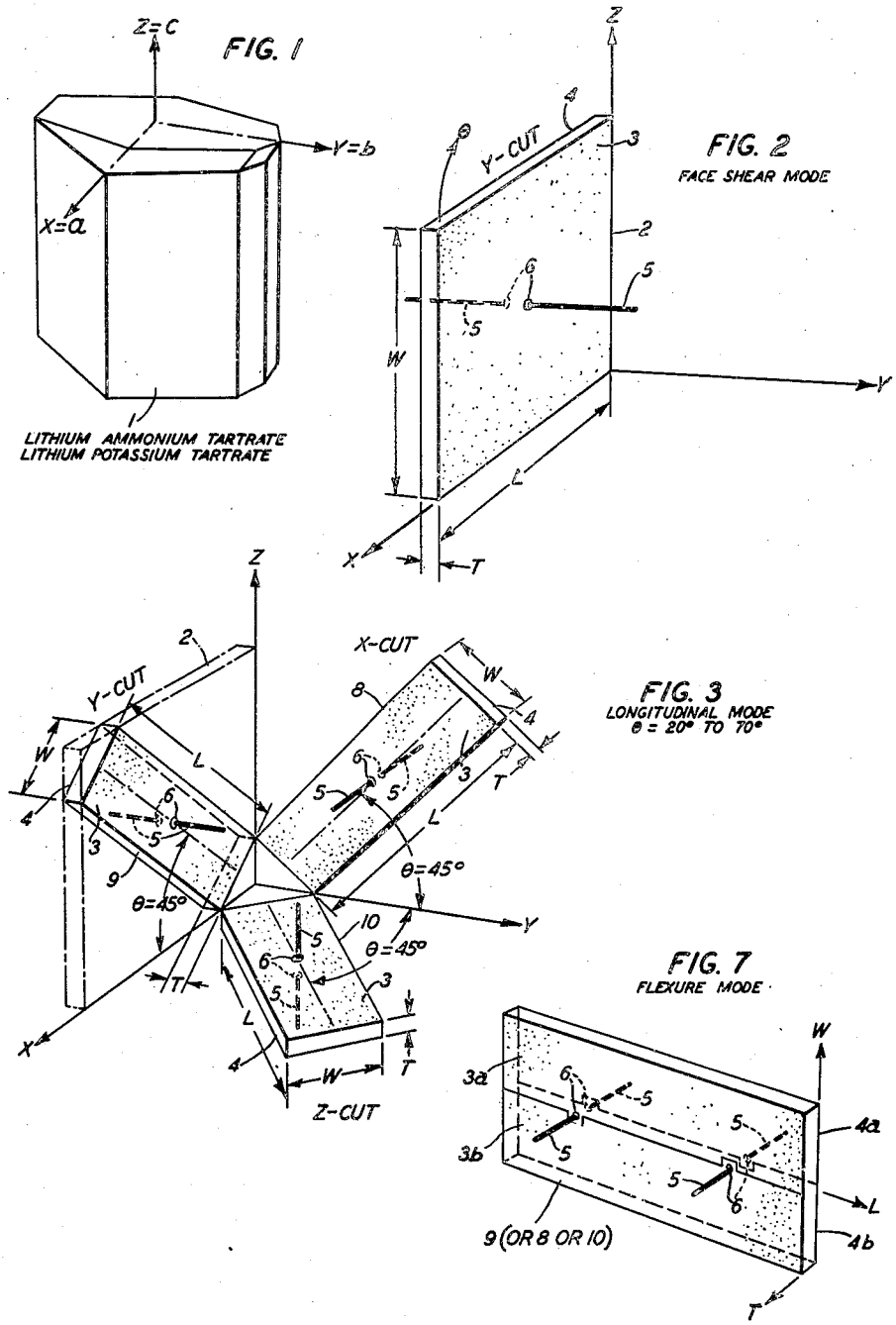

2,486,187

UNITED STATES PATENT OFFICE 2,486,187

PIEZOELECTRIC CRYSTAL APPARATUS

Warren P. Mason, West Orange, N. J., assignor to Bell Telephone Laboratories, Incorporated, New York, N. Y., a corporation of New York Application April 9, 1947, Serial No. 740,408

14 Claims. (Cl. 171—327)

This invention relates to piezoelectric crystal apparatus and particularly to piezoelectric crystal elements comprising crystalline lithium ammonium tartrate monohydrate

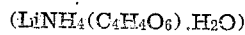

$(LiNH_4(C_4H_4O_6).H_2O)$ and the isomorphous lithium potassium tartrate monohydrate $(LiK(C_4H_4O_6).H_2O)$. Such crystal elements may be utilized as component circuit elements in electromechanical transducers, harmonic producers, oscillation generators and electric wave filter systems for example.

One of the objects of this invention is to provide advantageous orientations for piezoelectric crystal elements made from synthetic crystalline lithium ammonium tartrate monohydrate, or the isomorphous lithium potassium tartrate monohydrate.

A particular object of this invention is to provide synthetic lithium ammonium tartrate monohydrate crystal elements having a low or zero temperature coefficient of frequency.

Lithium ammonium tartrate monohydrate, as well as the isomorphous lithium potassium tartrate monohydrate, are salts of tartaric acid having a molecule which lacks symmetry elements. In crystalline form, they lack a center of symmetry and belong to a crystal class which is piezoelectric and which, in growth habit, is the orthorhombic bisphenoidal crystal class. By virtue of its structure, crystalline lithium ammonium tartrate monohydrate affords certain cuts having low or zero temperature coefficient of vibrational frequency. Also, crystalline lithium ammonium tartrate, as well as the isomorphous lithium potassium tartrate monohydrate, has but little water of crystallization, and hence will not dehydrate very much when used in air or in vacuum.

Crystal elements of suitable orientation cut from crystalline lithium ammonium tartrate monohydrate, or from the isomorphous lithium potassium tartrate monohydrate, may be excited in different modes of motion such as the face shear mode of motion, or the longitudinal mode of motion along the longest or lengthwise axis dimension thereof. Also, such longitudinal mode crystal elements may be utilized to provide flexural modes of motion which may be either of the width bending flexure type or the thickness bending flexure type. These modes of motion are similar in the general form of their motion and may be produced by electrode coatings and connections similar to those of corresponding names that are known in connection with quartz and other known piezoelectric crystals.

Lithium ammonium tartrate monohydrate is a synthetic crystalline substance which has certain orientations or cuts that give a zero or low temperature coefficient of frequency that are of interest in connection with electric wave filter structures for example. This substance also has ferroelectric properties at low temperatures, the indicated Curie temperature being around $-182°$ centigrade. The isomorphous lithium potassium tartrate monohydrate crystal has large negative temperature coefficients of frequency for all orientations.

It is useful to have a synthetic type of piezoelectric crystal element having a low or zero temperature coefficient of frequency. In accordance with this invention, such synthetic type crystal cuts may be Y-cut type cuts taken from crystalline lithium ammonium tartrate monohydrate and according to the cut and shape they may be adapted to operate in either the so-called face shear mode of motion or in the so-called longitudinal mode of motion substantially along the longest or length axis dimension thereof. Accordingly, the crystal cuts of the more special interest here are those of the Y-cut type comprising crystalline lithium ammonium tartrate which may have a low or zero temperature coefficient of frequency in either the face shear mode of motion, or in the lengthwise longitudinal mode of motion.

In the case of the face shear mode of motion, the lithium ammonium tartrate crystal element may be in the form of a 0-degree Y-cut type plate having square or nearly square major faces which may be disposed perpendicular or nearly perpendicular with respect to the Y or b axis, with the edges of such major faces being disposed parallel or nearly parallel with respect to X and Z axes, in order to obtain a zero or low temperature coefficient of frequency for the face shear mode of motion at about $+80°$ centigrade, or at some other or lower temperature where the edges are inclined with respect to the X and Z axes, instead of being disposed parallel thereto.

In the case of the lengthwise longitudinal mode of motion referred to, the lithium ammonium tartrate crystal elements may be in the form of a series of Y-cut type elongated plates having rectangular-shaped major faces which may be disposed perpendicular or nearly perpendicular with respect to the Y or b axis, with the longest or lengthwise axis dimension thereof being inclined at an angle in the range of angles from about 20 to 70 degrees with respect to the X or $a$ axis, in order to obtain a zero or low temperature coefficient of frequency for the lengthwise longitudinal mode of motion thereof, at a temperature of zero coefficient in the region from about 10° to 80° centigrade dependent upon the angle of cut selected.

Although the synthetic tartrate crystal elements provided in accordance with this invention have somewhat low values of electromechanical coupling, which is of the order of 10 per cent, they may be made to have a small change in frequency over a useful temperature range. This advantageous property together with the low cost and freedom from supply trouble indicate that these crystal elements may be used as electric circuit elements.

For a clearer understanding of the nature of this invention and the additional advantages, features and objects thereof, reference is made to the following description taken in connection with the accompanying drawing, in which like reference characters represent like or similar parts and in which:

Fig. 1 is a perspective view illustrating the form and growth habit in which a crystal of lithium ammonium tartrate monohydrate, as well as the isomorphous lithium potassium tartrate monohydrate, may crystallize, and also illustrating the relation of the surfaces of the mother crystal with respect to the mutually perpendicular X, Y and Z axes, and with respect to the corresponding crystallographic $a$, $b$ and $c$ axes;

Fig. 2 is a perspective view illustrating face shear mode crystal plates of the Y-cut type orientation, which may be cut from the mother crystal illustrated in Fig. 1;

Fig. 3 is a perspective view illustrating longitudinal mode crystal plates of the rotated X-cut, Y-cut and Z-cut type orientations, which may be cut from the mother crystal illustrated in Fig. 1, or from the crystal plate illustrated in Fig. 2 in the case of the Y-cut type orientation;

Fig. 4 is a graph illustrating the relation between the temperature of zero coefficient and the orientation angle, for Y-cut type crystal plates of lithium ammonium tartrate monohydrate having orientations as illustrated in Figs. 2 and 3;

Fig. 5 is a graph illustrating an example of the temperature-frequency characteristics of a 45-degree Y-cut lithium ammonium tartrate monohydrate crystal element of Fig. 3, when operated in the longitudinal mode of motion;

Fig. 6 is a graph illustrating the piezoelectric constants of lithium ammonium tartrate monohydrate crystals as a function of temperature for the three X, Y and Z axes directions of applied electric field; and Fig. 7 is a perspective view illustrating a length width or face flexure mode crystal plate which may be constructed from any of the longitudinal mode crystal plates oriented as illustrated in Fig. 3.

This specification follows the conventional terminology, as applied to piezoelectric crystal substances, which employs three mutually perpendicular X, Y and Z axes as reference axes to designate an electric axis, a mechanical axis and an optic axis respectively of the piezoelectric crystal substance, and which may employ three orthogonal axes X', Y' and Z' to designate the axial directions of a crystal body that is angularly oriented with respect to any of the X, Y and Z axes. As used in this specification and as shown in the drawing, the X axis corresponds to the $a$ axis, the Y axis to the $b$ axis, and the Z axis to the $c$ axis. The crystallographic $a$, $b$ and $c$ axes represent conventional terminology as used by crystallographers.

Referring to the drawing, Fig. 1 is a perspective view illustrating the form and growth habit in which a mother crystal 1 of lithium ammonium tartrate monohydrate as well as the isomorphous lithium potassium tartrate monohydrate, may crystallize, and also illustrating the location of the mutually perpendicular X, Y and Z axes thereof. As shown in Fig. 1, the optic axis Z corresponds to the $c$ axis and extends along the central vertical axis of the mother crystal 1, and the X and Y axes correspond to the $a$ and $b$ axes, respectively, and are both disposed normal to the Z axis and also to each other, as illustrated in Fig. 1.

The mother crystal 1 of Fig. 1 from which crystal elements of suitable orientation are to be cut, may be grown from any suitable nutrient solution and in any suitable manner such as for example by a rotary gyrator type crystallizer or by a rocking tank type crystallizer or by other crystallizer apparatus suitable for growing the mother crystal 1 to a suitable size and shape from a supersaturated watery nutrient solution. The nutrient solution from which the mother crystal 1 is grown may be prepared from suitable salts. As an illustrative example in the case of lithium ammonium tartrate monohydrate, the nutrient solution may be prepared as follows: In 4 liters of distilled water, 660 grams of tartaric acid are dissolved, the solution is heated, and 324 grams of lithium carbonate are added. After the evolution of carbon dioxide has ceased, 808 grams of ammonium tartrate are added to and dissolved in the solution, and the solution is filtered with the aid of suction while still hot. This procedure provides about 4½ liters of solution saturated somewhat above room temperature with lithium ammonium tartrate.

It will be understood that the mother crystal 1 of Fig. 1 may be grown to any suitable size such as, for example, a size of two inches or more in each of the three X, Y and Z axes directions thereof, or of other size large enough to suit the crystal elements of Figs. 2 and 3, which are to be cut therefrom.

Crystals 1 comprising lithium ammonium tartrate monohydrate, as well as the isomorphous lithium potassium tartrate monohydrate, have little water of crystallization and hence little vapor pressure and may be put in an evacuated or other container, and may be held at temperatures as high as about 100° centigrade. They have a cleavage or fracture plane which lies perpendicular to the Y axis (the 0, 1, 0 plane). While cleavage planes may make the crystal 1 somewhat more difficult to cut and process, nevertheless satisfactory processing may be done by any suitable means such as for example by using an abrading or sanding belt which may be cooled by oil or by a solution of water and ethylene glycol, for example.

Fig. 2 is a perspective view illustrating a face shear mode type of 0-degree Y-cut crystal element 2 which may be cut from a suitable mother crystal such as the mother crystal 1 shown in Fig. 1. As illustrated in Fig. 2, the crystal element 2 may be made into the form of a plate of substantially rectangular parallelepiped shape having a length axis dimension L, a width axis dimension W and a thickness or thin dimension T, the directions of the dimensions L, W and T being mutually perpendicular, and the thin or thickness axis dimension T being measured between the opposite parallel major or electrode faces of the crystal element 2. Where the major or electrode faces of the crystal element 2 are square in shape as particularly illustrated in Fig. 2, the dimensions L and W are made equal or nearly equal in value. The large dimensions L and W of the face shear mode crystal plate 2 of Fig. 2 may be made of values to suit the desired vibration frequency thereof. The thickness or thin dimension T thereof may be made of a value to suit the impedance of the system in which the crystal element 2 may be utilized as a circuit element; and also it may be made of a suitable value to avoid nearby spurious modes of motion which, by proper dimensioning of the thickness dimension T relative to the larger length and width dimensions L and W, may be placed in a location that is relatively remote from the desired face shear mode of of motion controlled mainly by the larger dimensions L and W of the crystal plate 2.

Suitable conductive electrodes such as the crystal electrodes 3 and 4 may be placed on or adjacent to or formed integral with the two opposite major faces of the crystal element 2 of Fig. 2, in order to apply electric field excitation thereto in the direction of the thickness axis dimension T and thereby to drive the crystal element 2 in the face shear mode of motion substantially along the major face dimensions thereof. The crystal electrodes 3 and 4, when formed integral with the crystal surfaces, may consist of a thin coating of gold, platinum, silver other suitable conductive material deposited on the crystal surfaces by evaporation in vacuum, or by other suitable process.

The electroded crystal element 2 of Fig. 2 may be nodally mounted and electrically connected by any suitable conductive means such as by oppositely disposed pressure type clamping pins, or by oppositely disposed conductive supporting spring wires 5 which may be individually attached by cement or other adhesive means to nodal regions at 6 at the center of the major faces of the face shear mode crystal element 2. Each of the pair of supporting wires 5 may be provided at its end with a small flat-headed end portion at 6, the outer surface of which may be secured directly to the major face of the crystal element 2 adjacent a node thereof at 6 by a spot of any suitable adhesive cement or resin such as by a spot of phenol product liquid resin. The electrical connections from each of the support wires 5 to the associated crystal electrode coatings 3 and 4 may be individually established by extending the respective conductive coatings 3 and 4 onto the associated supporting wires 5, as by evaporating a coating of gold over the cemented joint at 6, which in the case of the face shear mode crystal plate 2 of Fig. 2, is disposed at the center or nodal region of the major faces of the crystal plate 2. Examples of suitable supporting wires 5 adapted for the mounting of crystal elements are illustrated in United States Patent 2,371,613, granted March 20, 1945, to I. E. Fair and United States Patent 2,275,122, granted March 3, 1942, to A. W. Ziegler.

The dimensional ratio of the width axis dimension W with respect to the length axis dimension L of the crystal element 2 of Fig. 2 may be made of a value in the region of 1.0, and as particularly described herein is made equal to about 1.0, or substantially square-faced. The electrodes 3 and 4 provide an electric field in the direction of the thickness axis dimension T of the crystal plate 2 for producing a face shear mode of motion therein which, in the case of a lithium ammonium tartrate monohydrate crystal plate 2, may have a low or zero temperature coefficient of frequency.

As illustrated in Fig. 2, the orientation of the face shear mode crystal plate 2 with respect to the mutually perpendicular X, Y and Z axes of the crystalline material is that of a 0-degree Y-cut crystal plate having its major faces disposed perpendicular or nearly perpendicular with respect to the Y axis and having its peripheral edges disposed parallel or nearly parallel with respect to the X and Z axes. Such an orientation in a crystal plate 2 of Fig. 2 comprising lithium ammonium tartrate monohydrate has a substantially zero temperature coefficient for its face shear mode frequency, the zero coefficient occurring at a temperature of about $+80°$ centigrade where the Y-cut crystal plate 2 is unrotated, or at some other temperature when it is rotated in effect around the thickness axis dimension T. The arrow labeled $\theta$ as shown in Fig. 2 may be taken to indicate such a rotation of the face shear mode crystal plate 2 around or nearly around its Y-axis thickness dimension T.

While in Fig. 2 the crystal plate 2 is illustrated in the form of a 0-degree Y-cut type plate, it will be understood that a similar square-faced plate may also be provided in the form of an X-cut type plate, or a Z-cut type plate, for operation in the face shear mode of motion.

Fig. 3 is a perspective view illustrating a series of longitudinal mode X-cut, Y-cut and Z-cut piezoelectric crystal elements 8, 9 and 10 comprising lithium ammonium tartrate monohydrate, or the isomorphous lithium potassium tartrate monohydrate, that may be cut from a suitable mother crystal such as the mother crystal 1 illustrated in Fig. 1. As illustrated in Fig. 3, the longitudinal lengthwise mode crystal elements 8, 9 and 10 may each be made into the form of an elongated plate of rectangular parallelepiped shape having a longest or length axis dimension L, a width axis dimension W, and a thickness or thin dimension T, the directions of the dimensions L, W and T being mutually perpendicular. The length axis dimension L and the width axis dimension W of the crystal plates 8, 9 or 10 may be made of values to suit the desired vibrational frequency thereof. The thickness or thin dimension T may be made of a value to suit the impedance of the system in which the crystal element 8, 9 or 10 may be utilized as a circuit element; and also it may be made of a suitable value to avoid nearby spurious modes of motion which, by proper dimensioning of the thickness axis dimension T relative to the larger length and width axis dimensions L and W, may be placed in a location that is relatively remote from the desired longitudinal mode of motion along the length axis dimension L.

The dimensional ratio of the width axis dimension W with respect to the length axis dimension L of the longitudinal mode crystal elements 8, 9 or 10 of Fig. 3 may be made of a suitable value in the region less than 0.6, for example. The smaller values of dimensional ratio of the width W with respect to the length L, as of the order of 0.5 or less, have the effect of spacing the width W mode of motion at a frequency which is remote from the fundamental longitudinal mode of motion along the length axis dimension L.

Electrodes 3 and 4 disposed on the major faces of each of the crystal elements 8, 9 and 10 provide an electric field in the direction of the thickness axis dimension T for producing a useful longitudinal mode of motion along the length axis dimension L thereof. The electrodes 3 and 4 may be provided in divided or non-divided form as already known in connection with other longitudinal mode crystal elements. The composition of the electrodes 3 and 4 may be of the character as described hereinbefore in connection with the crystal plate 2 illustrated in Fig. 2.

When the crystal element 8, 9 or 10 of Fig. 3 is operated in the fundamental longitudinal mode of motion substantially along the length axis dimension L thereof, the nodal line occurs at the center of and transverse to the length axis dimension L, or about midway between the two opposite small ends thereof, and the crystal elements 8, 9 or 10 may be there nodally mounted and electrically connected by means of one or more pairs of oppositely disposed spring wires 5 secured at their headed ends 6 to the crystal surfaces by a spot of suitable cement placed at 6, as has already been described in connection with the wire mountings illustrated in Fig. 2.

As illustrated in Fig. 3, the orientations of the three longitudinal mode crystal plates 8, 9 and 10 with respect to the mutually perpendicular X, Y and Z axes of the crystalline material are those of an X-cut, a Y-cut and a Z-cut type crystal plate, respectively, having their major faces disposed perpendicular or nearly perpendicular with respect to the X, Y and Z axes respectively, and having their elongated length axis dimensions rotated in effect around such X, Y and Z axes respectively to a position where the $\theta$ angle has a value between about 20 and 70 degrees as illustrated in Fig. 3. The electrodes 2 and 3 provide an electric field in the direction of the thickness axis dimension T for producing a longitudinal mode of motion substantially along the length axis dimension L of each of the crystal elements 8, 9 and 10 which, in the case of the Y-cut type crystal element 9 comprising lithium ammonium tartrate monohydrate, may have a zero or low temperature coefficient of frequency, the temperature at which the lowest or zero temperature coefficient of frequency occurs therein being variable according to the angle of $\theta$ selected as illustrated by the curve in Fig. 4, the angle $\theta$ being measured in a plane perpendicular to the thickness axis dimension T and having a value from about 20 to 70 degrees with respect to the X axis, as illustrated in Fig. 3.

Lithium ammonium tartrate monohydrate forms in the bisphenoidal class of crystals as illustrated in Fig. 1. The elastic compliances $s_{11}^E$, $s_{22}^E$, $s_{12}^E$, $s_{13}^E$, $s_{23}^E$, $s_{33}^E$, plotted as a function of temperature, show a numerical increase with temperature. Of the three elastic constants $s_{44}^E$, $s_{55}^E$, $s_{66}^E$, two increase with temperature while the third one $s_{55}^E$ decreases with temperature. By obtaining orientations for which the elastic constant $s_{55}^E$ enters into proper combination with other elastic constants, it has been found possible to obtain orientations having a zero temperature coefficient of frequency. These orientations are the Y-cut type crystal elements 9 of Fig. 3 having the length axis dimension L thereof disposed intermediate the other two axes X and Z, as illustrated by the crystal plate 9 of Fig. 3 and having a temperature-frequency characteristic as illustrated in Figs. 4 and 5.

Fig. 4 is a graph illustrating the relation between the temperature in degrees centigrade at which the zero coefficient occurs and the $\theta$ angle orientation for Y-cut type longitudinal mode crystal elements 9 comprising lithium ammonium tartrate monohydrate, oriented as illustrated in Fig. 3, the longitudinal mode Y-cut crystal elements 9 having $\theta$ angles in the range from about 20 to 70 degrees. As illustrated in Fig. 4, when the $\theta$ angle has a value of about 45 degrees, the crystal plate 9 is a 45-degree Y-cut crystal plate 9 which, when comprising lithium ammonium tartrate monohydrate, has a zero temperature coefficient of frequency at about 80° centigrade for its longitudinal mode of motion along its length axis dimension L; and by rotating such a crystal element 9 in effect around the Y axis thickness axis dimension T thereof in either direction of rotation to other values for the $\theta$ angle in the range between about 20 and 70 degrees, the temperature at which the zero coefficient occurs may be changed to other values, as illustrated by the curve A in Fig. 4. For example, where the $\theta$ angle has a value of about 67½ degrees, the Y-cut longitudinal mode lithium ammonium tartrate monohydrate crystal plate 9 of Fig. 3 having its elongated length axis dimension L inclined at an angle of $\theta$=about 67½ degrees with respect to the X axis, has a zero temperature coefficient of frequency which occurs at a temperature of about +25° centigrade as indicated by the curve A in Fig. 4, and accordingly may be used at ordinary room temperatures with but little change in its frequency with changes in temperature extending above and below +25° centigrade.

Fig. 5 is a graph illustrating an example of the variation with temperature change in the resonant frequency $f_R$ and the antiresonant frequency $f_A$ for a $\theta$=45-degree Y-cut longitudinal mode lithium ammonium tartrate monohydrate crystal body 9 of Fig. 3, having a length axis dimension L, a width axis dimension W and a thickness axis dimension T of about 19.09, 2.2 and 0.88 millimeters respectively, giving a width W to length L dimensional ratio of about 0.12, and having a frequency constant for the fundamental longitudinal mode of motion along the length axis dimension L of about 167 kilocycles per second per centimeter of the length axis dimension L, a resonant frequency $f_R$ of about 87.5 kilocycles per second around ordinary room temperatures and higher, and a low temperature coefficient of frequency as shown by the curve $f_R$ in Fig. 5.

As illustrated by the curves in Fig. 5, the separation between the resonant frequency $f_R$ and the antiresonant frequency $f_A$ increases at low temperatures, and the piezoelectric constant $d_{25}$ controlling the Y-cut crystal plate 9 of Fig. 3 increases for the lower values of temperature, as illustrated by the solid line curve $d_{25}$ in Fig. 6. As illustrated by the curves in Fig. 5, the temperature coefficient of frequency is nearly zero at about +80° centigrade. The temperature frequency curvature constant $a_2$ is relatively large, being about $3.1 \times 10^{-6}$.

Fig. 6 is a graph illustrating by the curves $d_{14}$, $d_{25}$, $d_{36}$ therein a measure of the three piezoelectric constants $d_{14}$, $d_{25}$, $d_{36}$ as a function of temperature, the piezoelectric constants $d_{14}$, $d_{25}$, $d_{36}$ applying to the X-cut, Y-cut and Z-cut crystal plates 8, 9 and 10 respectively of Fig. 3, and all being expressed in centimeter-gram-seconds (C. G. S.) units. As illustrated in Fig. 6, the piezoelectric constant $d_{25}$ which pertains to the Y-cut crystal plate 9 of Fig. 3, has, in the case of lithium ammonium tartrate monohydrate crystals, a value of about $19 \times 10^{-8}$ at about $+30°$ centigrade, and at decreasing values of temperatures the value of the piezoelectric constant $d_{25}$ for lithium ammonium tartrate monohydrate gradually and markedly increases as shown by the solid line curve labeled $d_{25}$ (Y-cut) in Fig. 6. A plot of the inverse (not shown) of that $d_{25}$ curve of Fig. 6 is nearly a linear function of temperature and if the line of the curve be extended, the value of the inverse piezoelectric constant $$\frac{1}{d_{25}}$$

goes to zero at a temperature of about $-182°$ centigrade, indicating that the Y-cut lithium ammonium tartrate monohydrate crystal 9 of Fig. 3 should be ferro-electric at that temperature.

The dielectric constant for each of three X, Y and Z directions in lithium ammonium tartrate monohydrate crystals is, over a wide temperature range, of the order of 7.0 as expressed in centimeter-gram-seconds (C. G. S.) units, but shows a slight increase with decrease in temperature in the case of the Y-axis direction dielectric constant $\epsilon_{22}^T$.

In the case of the lithium potassium tartrate monohydrate crystals, the 45-degree X-cut, the 45-degree Y-cut and the 45-degree Z-cut crystal plates 8, 9 and 10 of Fig. 3 all have negative temperature coefficients of frequency, no ferro-electric properties are indicated, and the electromechanical coupling is under 10 per cent. The piezoelectric constant $d_{25}$, pertaining to the 45-degree Y-cut crystal plate 9 of Fig. 3, is illustrated by the broken line curve labeled, in Fig. 6, as $d_{25}$ for lithium potassium tartrate monohydrate.

While, as illustrated in Fig. 3, the crystal elements 8, 9 and 10 illustrate three differently oriented types of crystal elements of the X-cut, Y-cut and Z-cut type orientations respectively, they may be taken to represent other orientations by being rotated in effect about their length axis or width axis dimensions L and W to positions where their major faces are no longer perpendicular to the X, Y and Z axes thereof. In addition, the crystal elements 8, 9 and 10 of Fig. 3 may be rotated in effect about their respective thickness axis dimensions T to either side of the 45-degree angular position particularly illustrated in Fig. 3.

It will be understood that the crystal plates 2, 8, 9 and 10 of Figs. 2 and 3 may be provided with a selected dimensional ratio of the thickness axis T with respect to the larger major face dimensions L and W in order to avoid coupling with any undesired thickness mode such as the thickness flexure mode therein, which if it should get too close to the main mode resonance, may cause troublesome interference therewith. The optimum dimensional ratios of thickness T to length L may be ascertained by trial and experimental measurements, in accordance with the methods heretofore employed in connection with the dimensioning of quartz crystal plates.

It will be understood that the frequency of the main length mode of motion is substantially along the length axis dimension L and varies inversely as the value of the elongated length axis dimension L, and that the frequency and temperature coefficient of frequency will vary with the value of the dimensional ratio of width W to length L that is selected, and that the ratio of capacities is also a function of the dimensional ratio of the width W with respect to the length L, and that at the smaller values of dimensional ratio of width W to length L, as below 0.6 for example, the effects of the more remote secondary width W modes of motion upon the main length longitudinal L mode of motion are comparatively negligible.

Fig. 7 is a perspective view of the elongated crystal plate 8, 9 or 10 of Fig. 3 and provided with two separate pairs of opposite electrodes $4a$, $4b$, $3a$ and $3b$, instead of a single pair of electrodes 3 and 4, in order to operate it in a width-length type of face flexure mode of motion at a lower frequency having at the same time a low temperature coefficient of frequency. For frequencies below about 40 kilocycles per second for example, the size of the crystal plate 8, 9 or 10 may become inconveniently large when it is operated in the straight longitudinal length mode of motion as illustrated in Fig. 3 and it may then become desirable to provide for operation in a width bending type of flexure mode of motion by providing the crystal element 8, 9 or 10 of Fig. 3 with the divided type of integral electrodes $4a$, $4b$, $3a$ and $3b$ as illustrated in Fig. 7. For this purpose the electrodes $4a$, $4b$, $3a$ and $3b$ may be integral metal coatings similar to those shown in Fig. 3 but arranged as shown in Fig. 7, the electrode arrangement and connections being of the type described in United States Patent No. 2,259,317 granted October 14, 1941, to W. P. Mason, for example. It will be understood that the flexure mode crystal plate of Fig. 7 may comprise any of the tartrate crystal plates 8, 9 or 10 of Fig. 3 or suitable longitudinal mode crystal plate including a Y-cut plate 9 having its major faces cut perpendicular or nearly perpendicular to the Y axis with its length axis dimension L disposed from 20 to 70 degrees with respect to the X axis, as illustrated in Fig. 3.

While in Fig. 7 an arrangement is disclosed for operating the crystal plate 9 in the width bending or face mode of flexure motion, two of such crystal elements 9 may be glued, cemented or otherwise bonded together in major-face-to-major-face relation in order to form a duplex type crystal unit for operation at a still lower frequency in a thickness-length bending type of flexure motion. For this purpose, the crystal poling, electrode arrangement and electrode connections may be of the forms disclosed for example in C. E. Lane United States Patent No. 2,410,825, dated November 12, 1946.

The crystal elements provided in accordance with this invention may be protected from moisture by mounting in a suitable sealed container containing dry air or evacuated, or if desired by coating the crystal surfaces with plastic films or shellac films deposited from butanol or ethanol. It will be noted that the Y-cut type artificial crystal bodies provided in accordance with this invention may have per se a low or zero temperature coefficient of frequency, and hence do not require an added bar of material of equal and opposite temperature coefficient of frequency secured thereto in order to obtain an over-all low temperature coefficient of frequency.

It will be noted that among the advantageous cuts of lithium ammonium tartrate monohydrate illustrated and described in this specification are orientations for which the temperature-frequency coefficient may be zero at a specified temperature, the frequency variation being sufficiently small over ordinary temperature ranges to be useful, for example, in filter systems. The low temperature coefficient of frequency together with the high Q, the ease of procurement, the low cost of production and the substantial freedom from water of crystallization are advantages of interest for use as circuit elements in electrical systems generally.

While the crystal element 8, 9 or 10 of Fig. 3 is particularly described herein as being operated in the fundamental lengthwise mode of motion along its length axis dimension L, it will be understood that it may be operated in any even or odd order harmonic thereof in a known manner by means of a plurality of pairs of opposite interconnected electrodes spaced along the length L thereof, as in a known manner in connection with harmonic longitudinal mode quartz crystal elements. Also, if desired, the crystal element 8, 9 or 10 may be operated simultaneously in the longitudinal length L and width W modes of motion by arrangements as disclosed, for example, in W. P. Mason Patent 2,292,885 dated August 11, 1942; or simultaneously in the longitudinal length L mode of motion and the width W flexure mode of motion by arrangements as disclosed, for example, in W. P. Mason Patent 2,292,886 dated August 11, 1942.

Although this invention has been described and illustrated in relation to specific arrangements, it is to be understood that it is capable of application in other organizations and is therefore not to be limited to the particular embodiments disclosed.

What is claimed is:

1. Piezoelectric crystal apparatus comprising a piezoelectric lithium ammonium tartrate monohydrate crystal plate adapted for motion along its major faces at a frequency having a low temperature coefficient, said major faces being disposed substantially perpendicular to the Y axis of the three mutually perpendicular X, Y and Z axes, and means comprising electrodes disposed adjacent said major faces and applying an electric field to said crystal plate substantially in said Y axis direction for operating said crystal plate in said face mode of motion at said frequency having said low temperature coefficient.

2. Piezoelectric crystal apparatus comprising a piezoelectric lithium ammonium tartrate monohydrate crystal plate adapted for face shear motion along its major faces at a frequency having a low temperature coefficient, said major faces being disposed substantially perpendicular to the Y axis of the three mutually perpendicular X, Y and Z axes, and means comprising electrodes disposed adjacent said major faces and applying an electric field to said crystal plate substantially in said Y axis direction for operating said crystal plate in said face shear mode of motion at said frequency having said low temperature coefficient.

3. Piezoelectric crystal apparatus comprising a piezoelectric lithium ammonium tartrate monohydrate crystal plate adapted for face shear motion along its major faces at a frequency having a low temperature coefficient, said major faces being substantially square shaped and having dimensions of values corresponding to the value of said frequency, said major faces being disposed substantially perpendicular to the Y axis of the three mutually perpendicular X, Y and Z axes, and means comprising electrodes disposed adjacent said major faces and applying an electric field to said crystal plate substantially in said Y axis direction for operating said crystal plate in said face shear mode of motion at said frequency having said low temperature coefficient.

4. A piezoelectric lithium ammonium tartrate monohydrate crystal plate adapted for face shear motion along its major faces at a frequency having a low temperature coefficient, said major faces being disposed substantially perpendicular to the Y axis of the three mutually perpendicular X, Y and Z axes, said major faces being substantially rectangular shaped and having one set of opposite edges thereof disposed substantially parallel to said X axis and having another set of the opposite edges thereof disposed substantially parallel to said Z axis.

5. A piezoelectric lithium ammonium tartrate monohydrate crystal plate adapted for face shear motion along its major faces at a frequency having a low temperature coefficient, the dimensions of said major faces being values corresponding to the value of said frequency, said major faces being disposed substantially perpendicular to the Y axis of the three mutually perpendicular X, Y and Z axes, said major faces being substantially square shaped and having one set of opposite edges thereof disposed substantially parallel to said X axis and having another set of the opposite edges thereof disposed substantially parallel to said Z axis.

6. A piezoelectric lithium ammonium tartrate crystal plate adapted for face shear motion along its major faces at a frequency having a low temperature coefficient, the dimensions of said major faces being of values corresponding to the value of said frequency, said major faces being disposed substantially perpendicular to the Y axis of the three mutually perpendicular X, Y and Z axes, said major faces being substantially square shaped and having one set of opposite edges thereof disposed substantially parallel to said X axis and having another set of the opposite edges thereof disposed substantially parallel to said Z axis, and means comprising electrodes applying an electric field to said crystal plate substantially in said Y axis direction for operating said crystal plate in said face shear mode of motion at said frequency having said low temperature coefficient.

7. A piezoelectric lithium ammonium tartrate monohydrate crystal plate adapted for face shear motion along its major faces at a frequency having a low temperature coefficient, the dimensions of said major faces being of values corresponding to the value of said frequency, said major faces being disposed substantially perpendicular to the Y axis of the three mutually perpendicular X, Y and Z axes, said major faces being substantially square shaped and having one set of opposite edges thereof disposed substantially parallel to said X axis and having another set of the opposite edges thereof disposed substantially parallel to said Z axis, the dimension of each of said edges expressed in centimeters being a value of substantially 138 divided by the value of said frequency expressed in kilocycles per second.

8. A piezoelectric lithium ammonium tartrate monohydrate crystal plate adapted for longitudinal motion substantially along its elongated lengthwise axis dimension at a frequency having a low temperature coefficient, said crystal plate having substantially rectangular shaped major faces, said major faces being disposed substantially perpendicular to the Y axis of the three mutually perpendicular X, Y and Z axes, and said lengthwise axis dimension being inclined at one of the angles in the range of angles from substantially 20 to 70 degrees with respect to said X axis, said temperature coefficient being a value substantially as given by a point on the curve A of Fig. 4 corresponding to the value of said angle.

9. A piezoelectric lithium ammonium tartrate monohydrate crystal plate adapted for longitudinal motion substantially along its elongated lengthwise axis dimension at a frequency having a low temperature coefficient, said dimension being a value corresponding to the value of said frequency, said crystal plate having substantially rectangular shaped major faces, said major faces being disposed substantially perpendicular to the Y axis of the three mutually perpendicular X, Y and Z axes, and said lengthwise axis dimension being inclined at one of the angles in the range of angles from substantially 20 to 70 degrees with respect to said X axis, the width axis dimension of said major faces being perpendicular to said lengthwise axis dimension thereof, the ratio of said width axis dimension of said major faces with respect to said lengthwise axis dimension thereof being a value less than 0.6.

10. A piezoelectric lithium ammonium tartrate monohydrate crystal plate adapted for longitudinal motion substantially along its elongated lengthwise axis dimension at a frequency having a low temperature coefficient, said crystal plate having substantially rectangular shaped major faces, said major faces being disposed substantially perpendicular to the Y axis of the three mutually perpendicular X, Y and Z axes, and said lengthwise axis dimension being inclined at one of the angles in the range of angles from substantially 20 to 70 degrees with respect to said X axis, the width axis dimension of said major faces being perpendicular to said lengthwise axis dimension thereof, the ratio of said width axis dimension of said major faces with respect to said lengthwise axis dimension thereof being a value less than 0.6, said lengthwise axis dimension expressed in centimeters being one of the values in the range substantially from 160 to 190 divided by the value of said frequency expressed in kilocycles per second.

11. A piezoelectric lithium ammonium tartrate crystal plate adapted for longitudinal motion substantially along its elongated lengthwise axis dimension at a frequency having a low temperature coefficient, said dimension being a value corresponding to the value of said frequency, said crystal plate having substantially rectangular shaped major faces, said major faces being disposed substantially perpendicular to the Y axis of the three mutually perpendicular X, Y and Z axes, and said lengthwise axis dimension being inclined at one of the angles in the range of angles from substantially 20 to 70 degrees with respect to said X axis, the width axis dimension of said major faces being perpendicular to said lengthwise axis dimension, the ratio of said width axis dimension of said major faces with respect to said lengthwise axis dimension thereof being a value less than 0.6, and means comprising electrodes disposed adjacent said major faces and applying an electric field to said crystal plate substantially in said Y-axis direction for operating said crystal plate in said longitudinal mode of motion at said frequency having said low temperature coefficient.

12. Apparatus in accordance with claim 9 wherein the value of said angle is substantially 45 degrees.

13. Apparatus in accordance with claim 9 wherein the value of said angle is substantially 67½ degrees.

14. A piezoelectric lithium ammonium tartrate crystal body adapted for longitudinal motion substantially along its elongated lengthwise axis dimension at a frequency having a low temperature coefficient, said crystal body having major faces, said major faces being disposed substantially perpendicular to the Y axis of the three mutually perpendicular X, Y and Z axes, and said lengthwise axis dimension being inclined at one of the angles in the range of angles from substantially 20 to 70 degrees with respect to said X axis.

WARREN P. MASON.

REFERENCES CITED

The following references are of record in the file of this patent:

UNITED STATES PATENTS

| Number | Name | Date |
|---|---|---|
| 2,204,762 | Mason | June 18, 1940 |
| 2,218,225 | Willard | Oct. 15, 1940 |
| 2,272,994 | Mason | Feb. 10, 1942 |

OTHER REFERENCES

Low-Frequency Quartz-Crystal Cuts Having Low Temperature Coefficients, by W. P. Mason and R. A. Sykes, vol. 32, No. 4, April 1944.